United States Patent
Wood et al.

(10) Patent No.: US 7,748,591 B2
(45) Date of Patent: Jul. 6, 2010

(54) PRESSURE FOOT CLAMP FOR FRICTION STIR WELDING MACHINE

(75) Inventors: Jeffrey H. Wood, Eureka, MO (US); Mike P. Matlack, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 886 days.

(21) Appl. No.: 11/012,582

(22) Filed: Dec. 14, 2004

(65) Prior Publication Data

US 2006/0124691 A1 Jun. 15, 2006

(51) Int. Cl.
*B23K 20/12* (2006.01)
(52) U.S. Cl. .................. 228/2.1; 228/11.2; 428/615
(58) Field of Classification Search .............. 228/112.1, 228/2.1; 428/615
See application file for complete search history.

(56) References Cited

U.S. PATENT DOCUMENTS

| | | | |
|---|---|---|---|
| 546,421 A | 9/1895 | Duke | |
| 2,052,380 A | 8/1936 | Chapman | |
| 2,324,803 A | 7/1943 | Snyder | |
| 2,391,426 A | 12/1945 | Kramer et al | |
| 2,968,054 A | 1/1961 | Haumann et al. | |
| 3,110,277 A | 11/1963 | Dixon et al | |
| 3,376,184 A | 4/1968 | Ritchey et al | |
| 3,423,082 A | 1/1969 | Reyner | |
| 3,616,075 A | 10/1971 | Jarvis et al. | |
| 3,712,529 A | 1/1973 | Ozawa et al. | |
| 4,492,015 A | 1/1985 | Dearman | |
| 4,582,241 A | 4/1986 | Johnson | |
| 4,595,444 A | 6/1986 | Legge et al. | |
| 4,647,980 A | 3/1987 | Steventon et al. | |
| 4,684,113 A | 8/1987 | Douglas et al. | |
| 4,726,575 A | 2/1988 | Dearman | |
| 4,813,657 A | 3/1989 | Todd | |
| 4,948,491 A | 8/1990 | Kato et al. | |
| 4,964,606 A | 10/1990 | Beam et al. | |
| D320,028 S | 9/1991 | Sedighzadeh et al. | |
| 5,111,513 A | 5/1992 | Turner et al. | |
| 5,145,128 A | 9/1992 | Umeda | |
| 5,148,282 A | 9/1992 | Sedighzadeh | |
| 5,172,846 A | 12/1992 | Hayashi et al. | |

(Continued)

FOREIGN PATENT DOCUMENTS

DE 3734127 A1 4/1989

(Continued)

OTHER PUBLICATIONS

PCT International Search Report and Written Opinion for Application No. PCT/US2005/045390, dated Jun. 9, 2006, 18 pages.

*Primary Examiner*—Roy King
*Assistant Examiner*—Michael Aboagye

(57) ABSTRACT

Apparatus and methods for clamping and controlling flash around a manufacturing tool engaging a workpiece and preventing fill within the workpiece. In one embodiment, a clamp for securing a workpiece during a manufacturing operation includes a housing and a foot biased away from the housing, the foot defining an opening through which a manufacturing tool may pass to engage the workpiece. In another embodiment, the manufacturing tool is a rotating or counter-rotating shoulder friction stir spot welding tool. In accordance with other aspects of the invention, the foot defines at least one recess for holding flashing.

16 Claims, 9 Drawing Sheets

U.S. PATENT DOCUMENTS

| | | | |
|---|---|---|---|
| D332,714 S | 1/1993 | Sedighzadeh et al. | |
| D332,715 S | 1/1993 | Sedighzadeh et al. | |
| 5,181,771 A | 1/1993 | Robak et al. | |
| D333,061 S | 2/1993 | Sedighzadeh | |
| D333,398 S | 2/1993 | Sedighzadeh et al. | |
| D333,582 S | 3/1993 | Sedighzadeh et al. | |
| D334,763 S | 4/1993 | Sedighzadeh et al. | |
| D341,135 S | 11/1993 | Sedighzadeh et al. | |
| 5,263,632 A | 11/1993 | Zadrick et al. | |
| 5,280,892 A | 1/1994 | Smith | |
| 5,501,042 A | 3/1996 | Gustaveson et al. | |
| 5,535,938 A | 7/1996 | Leduc | |
| 5,583,735 A | 12/1996 | Pease et al. | |
| 5,590,604 A | 1/1997 | Lund | |
| 5,612,741 A | 3/1997 | Loban et al. | |
| 5,643,522 A | 7/1997 | Park | |
| 5,657,972 A | 8/1997 | Blatt | |
| D390,219 S | 2/1998 | Rosen | |
| 5,743,487 A | 4/1998 | Rice | |
| D394,432 S | 5/1998 | Rosen | |
| D399,200 S | 10/1998 | Rosen | |
| D399,503 S | 10/1998 | Rosen | |
| 5,823,274 A * | 10/1998 | Wisakanto et al. | 175/215 |
| 5,847,685 A | 12/1998 | Otsuki | |
| D409,597 S | 5/1999 | Rosen | |
| D410,458 S | 6/1999 | Rosen | |
| 5,953,137 A | 9/1999 | Sirat et al. | |
| 5,954,842 A | 9/1999 | Fogal et al. | |
| 6,092,705 A | 7/2000 | Meritt | |
| 6,127,646 A | 10/2000 | Aebersold et al. | |
| 6,189,764 B1 | 2/2001 | Hannan | |
| 6,237,832 B1 | 5/2001 | Chung | |
| 6,264,088 B1 * | 7/2001 | Larsson | 228/2.1 |
| 6,371,353 B1 | 4/2002 | Ikeda et al. | |
| 6,424,386 B1 | 7/2002 | Shimizu | |
| 6,551,428 B1 | 4/2003 | Guillou et al. | |
| 6,554,175 B1 * | 4/2003 | Thompson | 228/112.1 |
| 6,666,371 B2 | 12/2003 | Nakazawa et al. | |
| 6,722,556 B2 | 4/2004 | Schilling et al. | |
| 6,766,939 B2 * | 7/2004 | Shepherd | 228/112.1 |
| 6,769,595 B2 | 8/2004 | Stol et al. | |
| 6,986,452 B2 | 1/2006 | Dracup et al. | |
| 7,210,610 B2 | 5/2007 | Nelson et | |
| 7,216,793 B2 | 5/2007 | Stotler et al. | |
| 7,322,981 B2 | 1/2008 | Jackson | |
| 7,448,526 B2 * | 11/2008 | Haynie et al. | 228/2.1 |
| 2002/0179682 A1 * | 12/2002 | Schilling et al. | 228/112.1 |
| 2003/0116609 A1 | 6/2003 | Dracup et al. | |
| 2003/0209586 A1 | 11/2003 | Thompson | |
| 2005/0001010 A1 | 1/2005 | Koga et al. | |
| 2005/0092817 A1 | 5/2005 | Baumann et al. | |
| 2005/0093219 A1 | 5/2005 | Baumann | |
| 2006/0102689 A1 | 5/2006 | Trapp et al. | |
| 2006/0102699 A1 | 5/2006 | Burton et al. | |
| 2006/0169741 A1 | 8/2006 | Smith et al. | |

FOREIGN PATENT DOCUMENTS

| | | |
|---|---|---|
| EP | 1541274 A1 | 6/2005 |
| FR | 2576371 | 7/1985 |
| GB | 1332523 | 1/1971 |
| GB | 2169836 A | 7/1986 |
| JP | 2002120076 * | 4/2002 |
| JP | 2003154472 | 5/2003 |
| JP | 2003205374 | 7/2003 |
| WO | WO2004018141 A1 | 3/2004 |
| WO | WO2005042208 A2 | 5/2005 |

* cited by examiner

PRESSURE FOOT CLAMP FOR FRICTION STIR WELDING MACHINE

FIELD OF THE INVENTION

This invention relates generally to assembly tools and, more specifically, to clamping mechanisms.

BACKGROUND OF THE INVENTION

The manufacture of certain types of equipment and vehicles, including aircraft, often involves the process of holding together sheets or sections of metal for attachment. Attachment of the sheets or sections of metal may include welding, including friction stir welding, or other bonding processes.

In friction stir welding, plunging the friction stir welding tool into a workpiece can push the parts of the workpiece being welded away from each other, and can result in uncontrolled fill between the work pieces due to sheet lifting, and/or flash up into the welding tool. Accordingly, there is an unmet need in the art for clamping systems that can engage a workpiece close to a manufacturing tool, prevent sheet-lifting fill, and/or control flashing generated during manufacturing.

SUMMARY

The present invention is directed to apparatus and methods for clamping and controlling flash around a manufacturing tool engaging a workpiece and preventing fill within the workpiece. In one embodiment, a clamp for securing a workpiece during a manufacturing operation includes a housing, and a foot biased away from the housing, the foot defining an opening through which a manufacturing tool may pass to engage the workpiece. In another embodiment, the manufacturing tool is a rotating or counter-rotating shoulder friction stir spot welding tool. In accordance with other aspects of the invention, the foot defines at least one recess for holding flashing.

BRIEF DESCRIPTION OF THE DRAWINGS

Preferred and alternate embodiments of the present invention are described in detail below with reference to the following drawings.

DETAILED DESCRIPTION

The present invention relates to apparatus and methods for clamping and controlling flash around a manufacturing tool engaging a workpiece. Many specific details of certain embodiments of the invention are set forth in the following description and in FIGS. 1-6 to provide a thorough understanding of such embodiments. One skilled in the art, however, will understand that the present invention may have additional embodiments, or that the present invention may be practiced without several of the details described in the following description.

Figure 1:
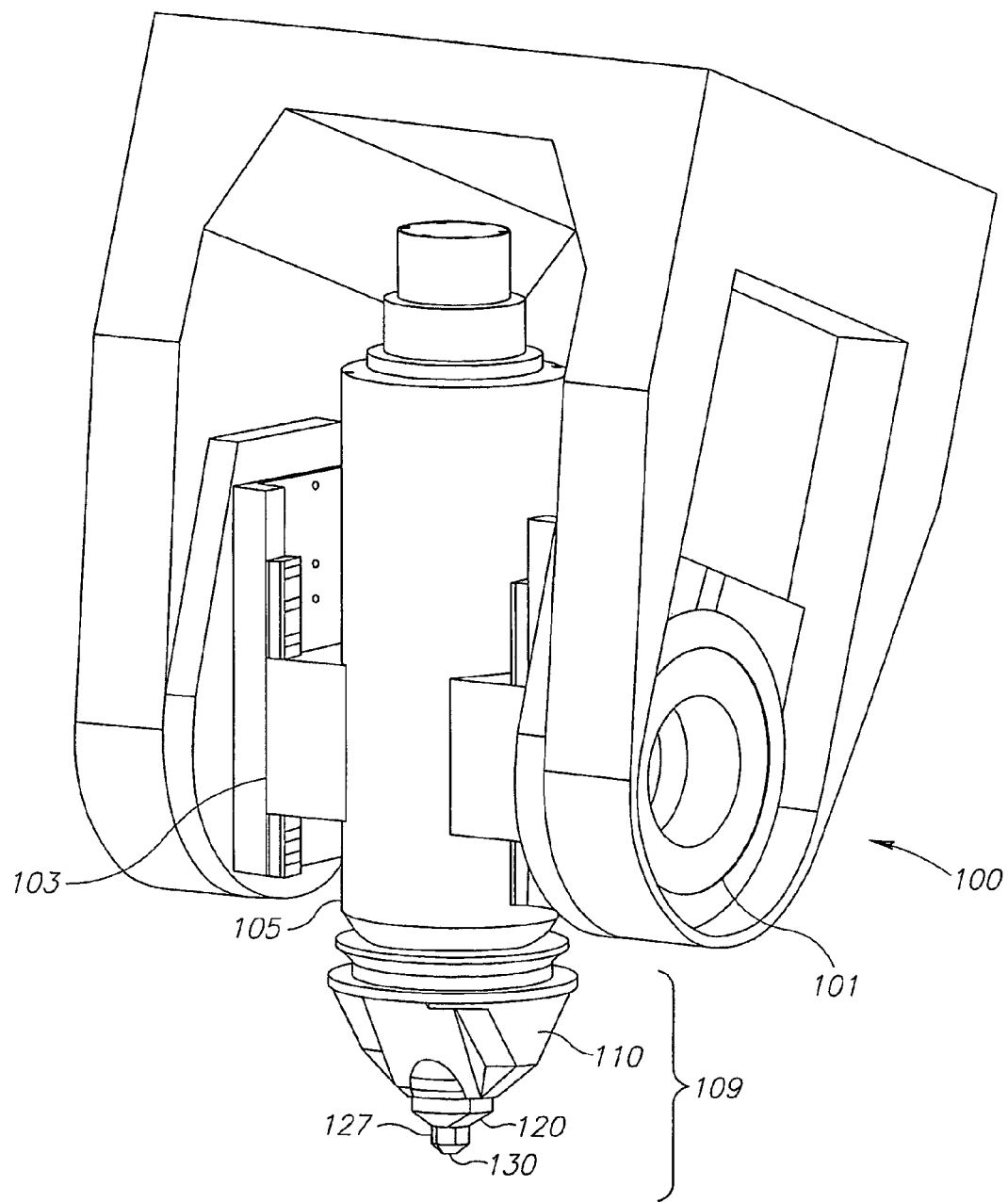
FIG. 1 is an isometric view of an exemplary friction stir spot welding head in accordance with an embodiment of the present invention.

FIG. 1 is an isometric view of an exemplary friction stir spot welding head 100 in accordance with an embodiment of the present invention. The head 100 is the working portion of a friction stir spot welding machine. In this embodiment, the head 100 includes a dual spindle drive 105 configured to separately drive, advance, and retract a friction stir spot welding tool (not shown) and a shoulder tool (not shown), as described more fully below. The shoulder tool may be configured to concentrically surround at least the tip of the friction stir spot welding tool. By way of example and not limitation, the dual spindle drive 105 suitably may be a component manufactured by Brotje Automation, of Wiefelstede, Germany. The dual spindle drive 105 may advance its spindles at approximately 0.25" per minute. The dual spindle drive 105 is mounted on a pivot 101 enabling the angle of the drive 105 to be adjusted with respect to a workpiece. The dual spindle drive 105 is also mounted on a track 103 permitting the drive 105 to be advanced toward and away from the workpiece.

Attached to the dual spindle drive 105 is an exemplary pressure foot assembly 109 of the present invention. The assembly 109 includes a generally conically-tapered nose piece 110 with the wide end of the nose piece 110 attached to the spindle drive 105, and the narrower end directed toward the workpiece. Attached to and bridging the narrower end of the nose piece 110 is a clamp housing 120. Threaded to the clamp housing 120 is a retaining cap 127. Projecting through the retaining cap is a pressure foot 130 in accordance with an embodiment of the present invention.

Figure 2:
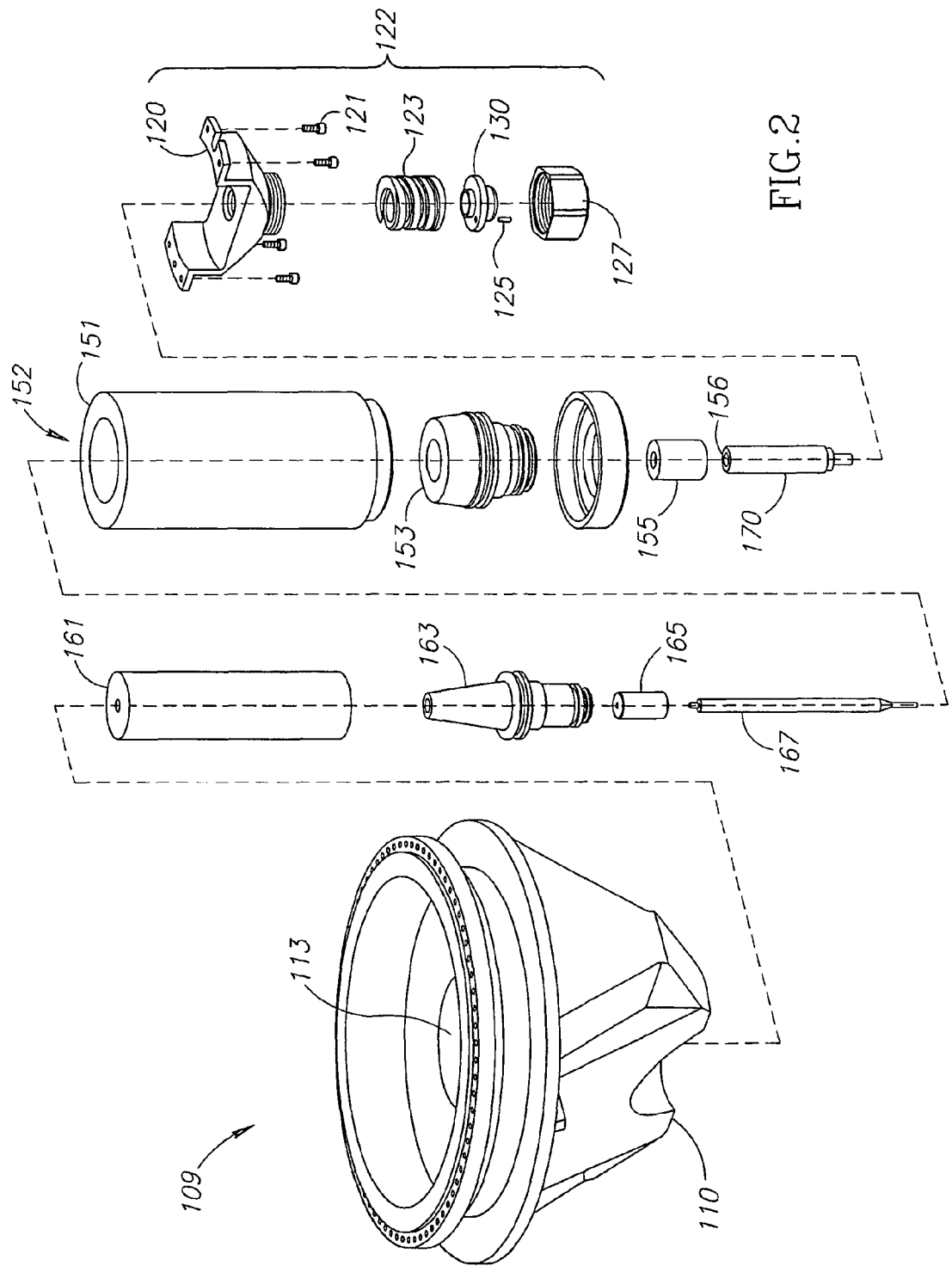
FIG. 2 is an exploded view of an exemplary pressure foot assembly in accordance with an embodiment of the present invention.

FIG. 2 is an exploded view of the pressure foot assembly 109 of the welding head 100 of FIG. 1. The nose piece 110 defines a central opening 113 through which a shoulder spindle 151 passes to hold and drive a shoulder tool 170. The shoulder spindle 151 is the outer spindle of the dual spindle drive 105 of FIG. 1. The shoulder spindle 151 includes an opening 152 along its axis through which a pin tool spindle 161 passes holding a friction stir spot welding pin tool 167. The outer shoulder spindle 151 also holds a shoulder tool holder 153. The shoulder tool holder 153 in turn is coupled with a collet 155 which grips and holds the shoulder tool 170, permitting the shoulder tool 170 to be driven by the shoulder spindle 151. In one particular embodiment, the shoulder tool holder 153 may be an HSK-A 100 tool holder available from Rego-Fix under catalog number 4500.72550, and the shoulder collet 155 may be a ⅞" powRgrip collet, also available from Rego-Fix. The dual spindle drive 105 of FIG. 1 suitably may rotate the shoulder spindle 151 at a desired working speed, and may also advance the shoulder spindle 151 towards and away from a workpiece through the opening 113 in the nose piece 110. In one particular embodiment, the shoulder tool 170 suitably has an outside diameter of approximately 0.424".

The opening 152 along the axis of the shoulder spindle 151 extends through the shoulder tool holder 153, the shoulder collet 155, and the shoulder tool 170, permitting a pin spindle 161 with an attached pin tool 167 to pass therethrough. The shoulder tool 170 includes a central opening 156 along its axis. In one embodiment, the central opening 156 has an internal diameter sufficient to clear a 0.190" diameter friction stir spot welding pin tool 167 with a 0.001" working clearance. Thus, the pin spindle 161 may be rotated at a working speed and moved towards and away from the workpiece with the attached pin tool 167, independent from the shoulder spindle 151 and shoulder tool 170.

As further shown in FIG. 2, a pin tool holder 163 is engaged with the pin spindle 161 and holds a pin collet 165 which, in turn, grips the pin tool 167. In this exemplary embodiment, the pin tool 167 is suitably a friction stir spot welding pin tool. The pin tool holder 163, by way of example but not limitation, suitably may be an HSK-E 40 available from Rego-Fix under catalog #450.71544, and the pin collet 165 suitably may be a ½" powRgrip collet available from Rego-Fix under catalog #1725.12701.

The various components of the pressure foot assembly 109 may be formed from any suitable materials. In one particular embodiment, for example, the shoulder tool 170 and the pin tool 167 may be machined from H13 tool steel for performing friction stir spot welding of an aluminum workpiece. Of course, other materials suitably may be utilized for welding other metals.

With continued reference to FIG. 2, the shoulder tool 170 and the pin tool 167 project through an exemplary clamp 122 of the present invention to engage the workpiece. In this embodiment, the clamp 122 includes a clamp housing 120 attached to the nose piece 110 with fasteners 121. The clamp housing 120 is counter bored to hold a die spring 123. The die spring 123 biases an exemplary pressure foot 130 of the present invention away from the clamp housing 120, and thus away from the nose piece 110 of the friction stir spot welding head (FIG. 1). The pressure foot 130 applies a clamping force to the workpiece, and also defines an opening for the shoulder tool 170 (with the pin tool 167 within the shoulder tool 170) and provides flash control, as described further below with reference to FIGS. 4 and 5. The pressure foot 130 is held from falling loose from the clamp housing 120 by a retainer cap 127. The pressure foot 130 projects partially through the center of the retainer cap 127 to engage the workpiece. In one particular embodiment, the pressure foot 130 may be machined from MP159 tool steel, with an inside diameter providing a 0.001" working clearance between the pressure foot 130 and the shoulder tool 170. A pin 125 attached to the pressure foot 130 extends into a recess in the retaining cap 127 to prevent the pressure foot 130 from rotating when the shoulder tool 170 rotates during a weld.

Figure 3:
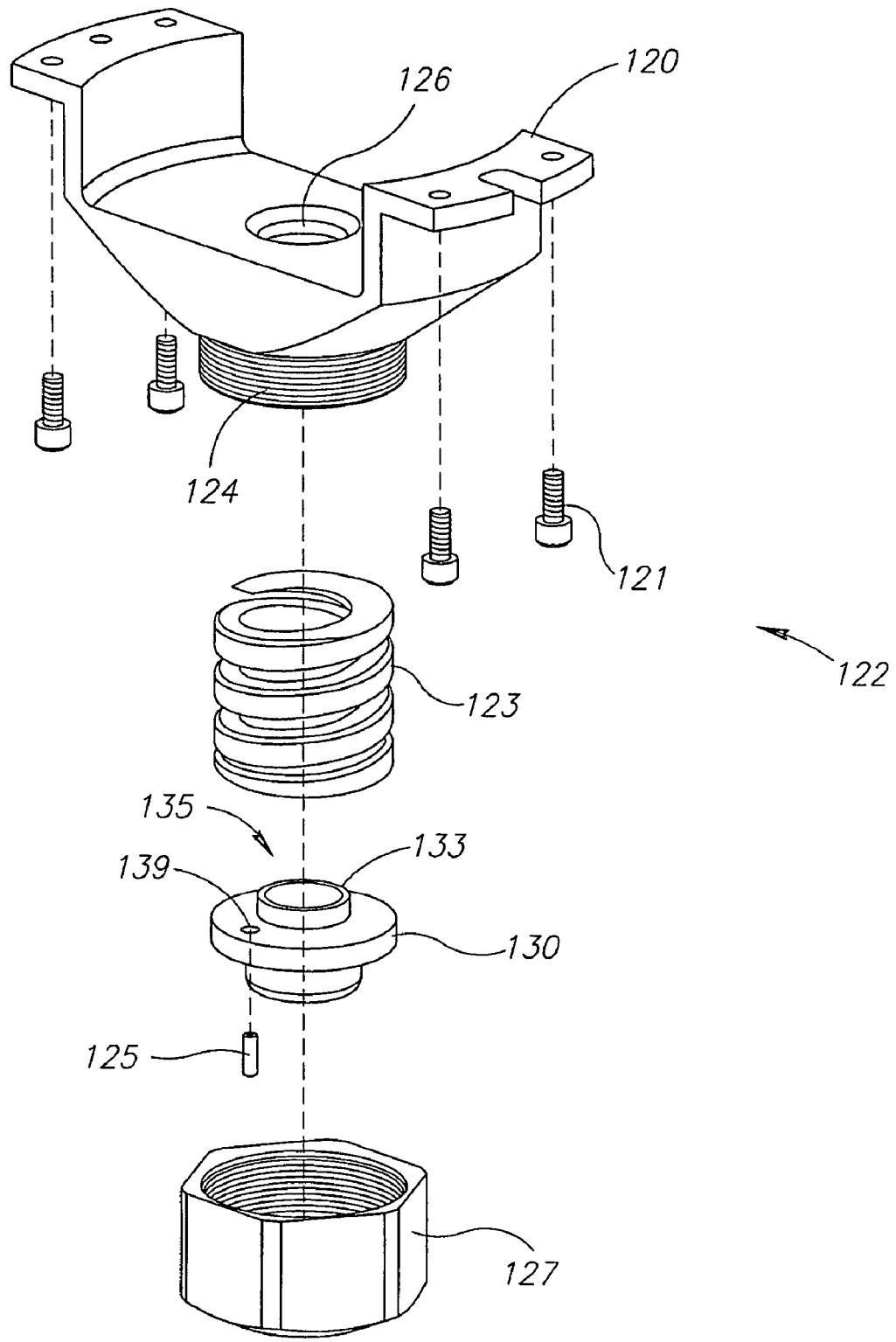
FIG. 3 is an exploded view of an exemplary clamp apparatus in accordance with an embodiment of the present invention.

FIG. 3 is an enlarged isometric exploded view of the clamp 122 of FIG. 2. The clamp housing 120 is configured to be held by fasteners 121 to bridge the nose piece 110. The clamp housing 120 defines a central opening 126 through which the shoulder tool 170 and with its enclosed pin tool 167 may pass when engaging a workpiece. The clamp housing 120 includes an externally threaded projection 124 on the workpiece side. The die spring 123 fits up within a counter bored opening within the threaded projection 124. The die spring 123 biases the pressure foot 130 away from the clamp housing 120.

The pressure foot 130 defines a central pressure foot hole 135 through which the shoulder tool 170 with the enclosed pin tool 167 (FIG. 2) passes. In this exemplary embodiment, the pressure foot 130 includes a ring 133 on its side away from the workpiece that helps to retain secondary flashing material moving upward along the outside of the shoulder tool 170 and inside the hole 135 generated during the manufacturing process, including friction stir spot welding, as described more fully below with respect to FIG. 5.

As further shown in FIG. 3, the pressure foot 130 includes a pin retainer hole 139 that holds the pin 125. The pin 125 projects outward from the pressure foot 130 towards the workpiece into a lip of the retaining cap 127, preventing the pressure foot 130 from rotating when the manufacturing tool is rotated at working speeds. The retaining cap 127 is internally threaded and engages the threaded projection 124 of the housing 120. The retaining cap 127 retains the pressure foot 130 in place while allowing it to be biased away from the clamp housing 120 by the die spring 123.

Figure 4:
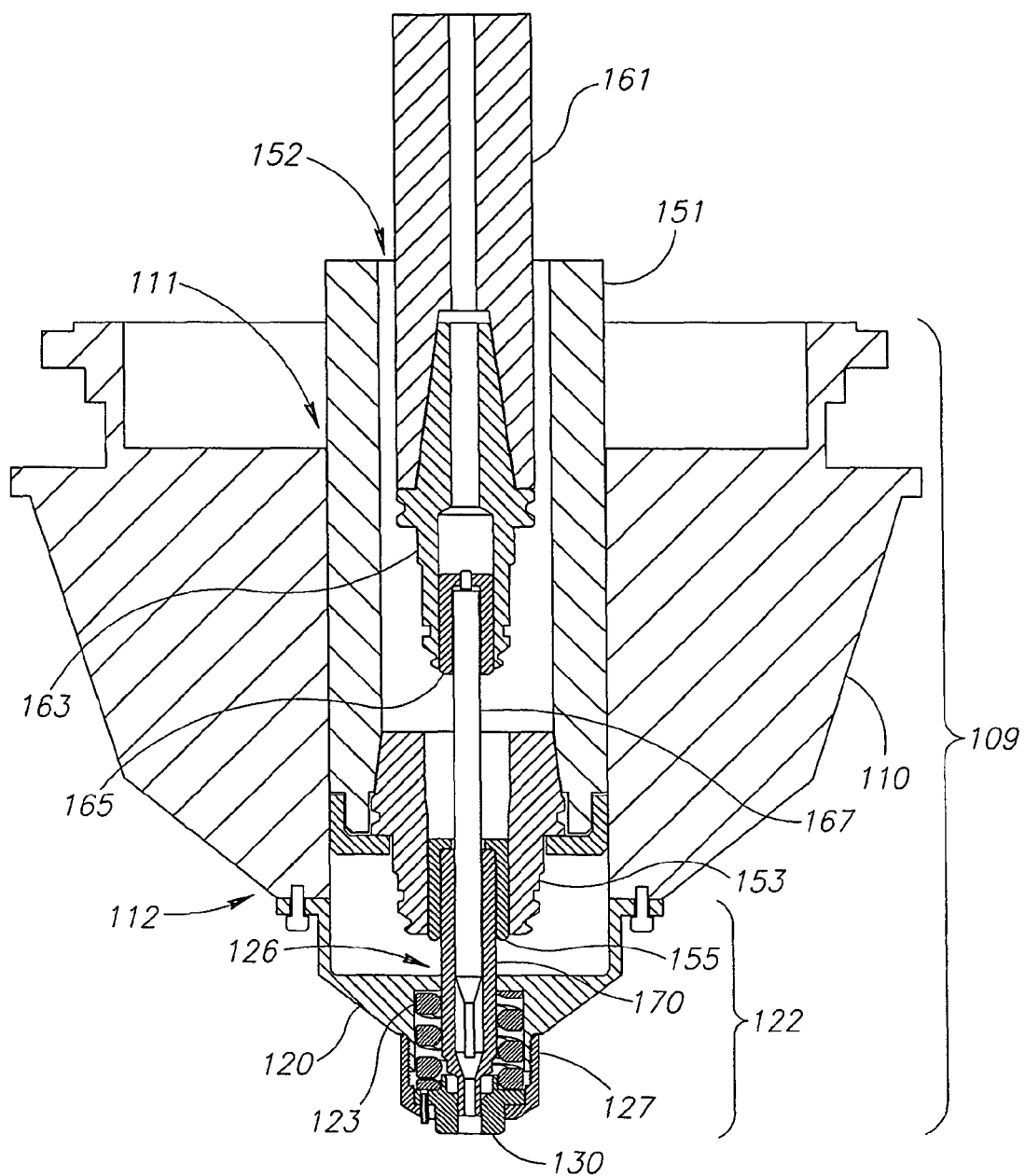
FIG. 4 is a cross-section of an exemplary pressure foot assembly in accordance with an embodiment of the present invention.

FIG. 4 is a cross-section of the pressure foot assembly 109 of FIGS. 1 and 2 and including the attached clamp 122. The nose piece 110 defines a cylindrical bore 111 within which the shoulder spindle 151 may rotate and be advanced towards and away from a workpiece. As described above, the shoulder spindle 151 is cylindrical and hollow and defines an opening 152 along its axis through which the pin spindle 161 with its attached components, including the pin tool 167, may independently rotate from the shoulder spindle 151, and may independently be advanced towards and away from the workpiece.

The pin spindle 161 (within the shoulder spindle 151) holds the pin tool holder 163 which in turn holds a pin collet 165 gripping the friction stir spot welding pin tool 167. The shoulder spindle 151 (within the nose piece 110) holds a shoulder tool holder 153 in turn holding the shoulder collet 155 gripping the shoulder tool 170. Attached to the narrower tip end 112 of the nose piece 110 (towards the workpiece from the friction stir welding machine) is the exemplary clamp 122 of the present invention as described with reference to FIG. 3 above. The clamp housing 120 forms the base of the clamp 122 by bridging the bore 111 of the nosepiece 110. The clamp housing 120 defines an opening 126 through within which the shoulder tool 170 may independently rotate and be moved toward and away from the workpiece. The pressure foot 130 is configured as shown in more detail in FIG. 5 below, is configured to permit the shoulder tool 170 to rotate within the pressure foot 130, engage the workpiece (through the center of the pressure foot 130), and to contain flashing material. The pressure foot 130 is biased away from the clamp housing 120 by the die spring 123. The pressure foot 130 is retained from coming loose from the clamp housing 120 by the retaining cap 127.

Figure 5:
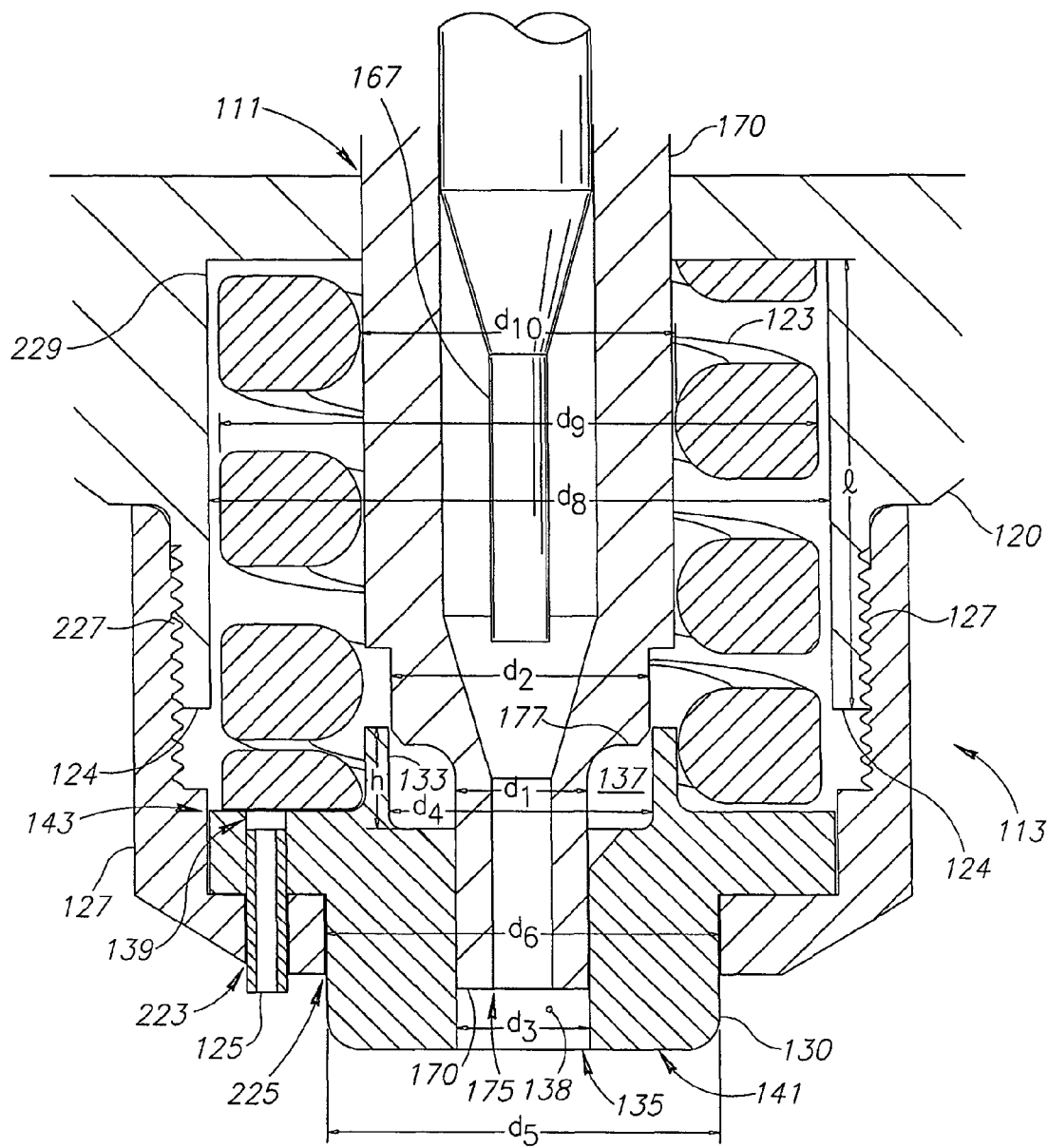
FIG. 5 is an enlarged cross-section of an exemplary tip of the pressure foot assembly of FIG. 4.

FIG. 5 is an enlarged cross-section of a tip portion 113 of the pressure foot assembly 109 of FIGS. 2 and 4 above. As noted, the clamp housing 120 defines a cylindrical bore 111 within which the shoulder tool 170 may independently rotate and be moved towards and away from a workpiece. Formed in the clamp housing 120 is a counter bore 229 with a diameter $d_8$ sufficient to hold with working clearance the die spring 123 with a diameter of $d_9$. The counter bore 229 has a depth 1 that is properly selected such that when the die spring 123 is inserted into the counter bore 229, and the pressure foot 130 is placed over the die spring 123 and held in place by the retainer cap 127, that the pressure foot 130, projecting through the retainer cap 127, applies a suitable clamping force to the workpiece 120. This clamping force is applied when the pressure foot assembly 109 is brought against a workpiece by moving the welding head 100 (FIG. 1) and or the dual spindle drive 105 (FIG. 1) towards the workpiece.

The die spring 123 preferably has a suitable inside clearance $d_{10}$ to permit the shoulder tool 170 to rotate within the spring 123 without obstruction.

In this exemplary embodiment, the pressure foot 130 defines a central cylindrical hole 135 with a diameter $d_3$. In one particular embodiment, the central hole 135 is approximately 0.001" larger in diameter than the diameter $d_1$ of the working tip of the shoulder tool 170. This clearance suitably permits the shoulder tool 170 to rotate within the pressure foot 130 and to move towards and away from the workpiece independent of the pressure foot 130 while minimizing the upward (away from the workpiece) passage of any secondary metal flashing or tailings material generated during the friction stir spot welding process. The hole 135 in the pressure foot 130 defines a primary flash holding area 138 when the shoulder tool 170 is withdrawn within into the pressure foot 130, away from a workpiece side 141 of the pressure foot 130.

In operation, the workpiece side 141 of the pressure foot 130 is engaged with and applies pressure to the workpiece when the tip area 113 of the pressure foot assembly 109 is pressed against a workpiece. A machine side 143 of the pressure foot 130, in this exemplary embodiment, includes a ring 133 that projects upwardly a height h. The ring 133 has a common axis with the pressure foot hole 135 through which the shoulder tool 170 runs, but has a diameter $d_4$ that is greater than the pressure foot hole 135 diameter $d_3$. The ring 133 thus defines a secondary flashing cavity 137 on the machine side 143 of the pressure foot 130 with a height h. The diameter $d_4$ of the cavity 137 is larger than the diameter $d_1$ of the tip of the shoulder tool 170. The cavity 137 suitably collects secondary flashing material which may work its way up through the pressure foot 130 through the clearance between the diameter $d_3$ of the pressure foot hole 135 and the diameter $d_1$ of the shoulder tool 170. The shoulder tool 170 in turn has its own shoulder or overhang 177 where the shoulder tool 170 transitions from a tip diameter $d_1$ to a larger second diameter $d_2$. In one particular embodiment, the second diameter $d_2$ suitably is approximately 0.001 inches less than diameter $d_4$, the diameter of the cavity 137 in the machine side 143 of the pressure foot 130. The shoulder tool 170 with its overhang 177 suitably nests within the cavity 137, leaving space for flashing collection. The shoulder tool 170 tip area with a diameter $d_1$ projects further into and through the pressure foot 130 to make contact with the workpiece.

It will be appreciated that as the shoulder tool 170 is rotated and moved away and then towards the workpiece (not shown) during a friction stir spot welding operation that secondary flashing or metal tailings in the recess 138 at the workpiece surface that are not forced from the recess 138 at the workpiece surface back into the spot weld by the shoulder tool 170 are gathered within the cavity 137 of the pressure foot 130. This sequence is described in more detail with reference to FIGS. 6A through 6D below. The pressure foot 130 is removable (in this embodiment by removal of the retainer cap 127) from the clamp housing 120 permitting the cavity 137 to be cleaned.

The pressure foot 130 projects its workpiece side 141 through a clamp hole 225 defined by the retaining cap 127. The working side 141 of the pressure foot has a diameter d.sub.5 slightly smaller than the diameter $d_6$ of the clamp hole 225 in the retaining cap 127, permitting the pressure foot 130 to be freely biased by the retaining die spring 123 through the retaining cap 127 by the die spring 123. At the same time the pressure foot 130 is retained in position laterally by the retaining cap 127. The retaining cap 127 is internally threaded with threads 227 to engage the threaded projection 124 of the clamp housing 120. The threaded projection 124 is counter bored with a counter bore 229 to hold the die spring 123, as described above. The retaining cap 127 is thus threaded over the threaded projection 124 of the clamp housing 120, holding the pressure, foot 130 in place against the die spring 123. The die spring 123 biases the pressure foot 130 through the retaining cap 127 away from the clamp housing 120 applying a spring loaded force to the workpiece through the working face 141 of the pressure foot 130.

The pressure foot 130 is prevented from rotating within the retaining cap 127 by the pin 125 that is anchored within a pin hole 139 within an outer edge of the pressure foot 130. It will be appreciated that the pressure foot 130 and the retaining cap 127 suitably may be shaped to prevent rotation of the pressure foot 130 in lieu of, and/or in addition to the pin 125. By way of example but not limitation, the workpiece side 141 of the pressure foot 130 may be hexagonal-shaped with a corresponding hexagonal-shaped pressure foot hole 225 though the retainer cap 127.

Figure 6A:
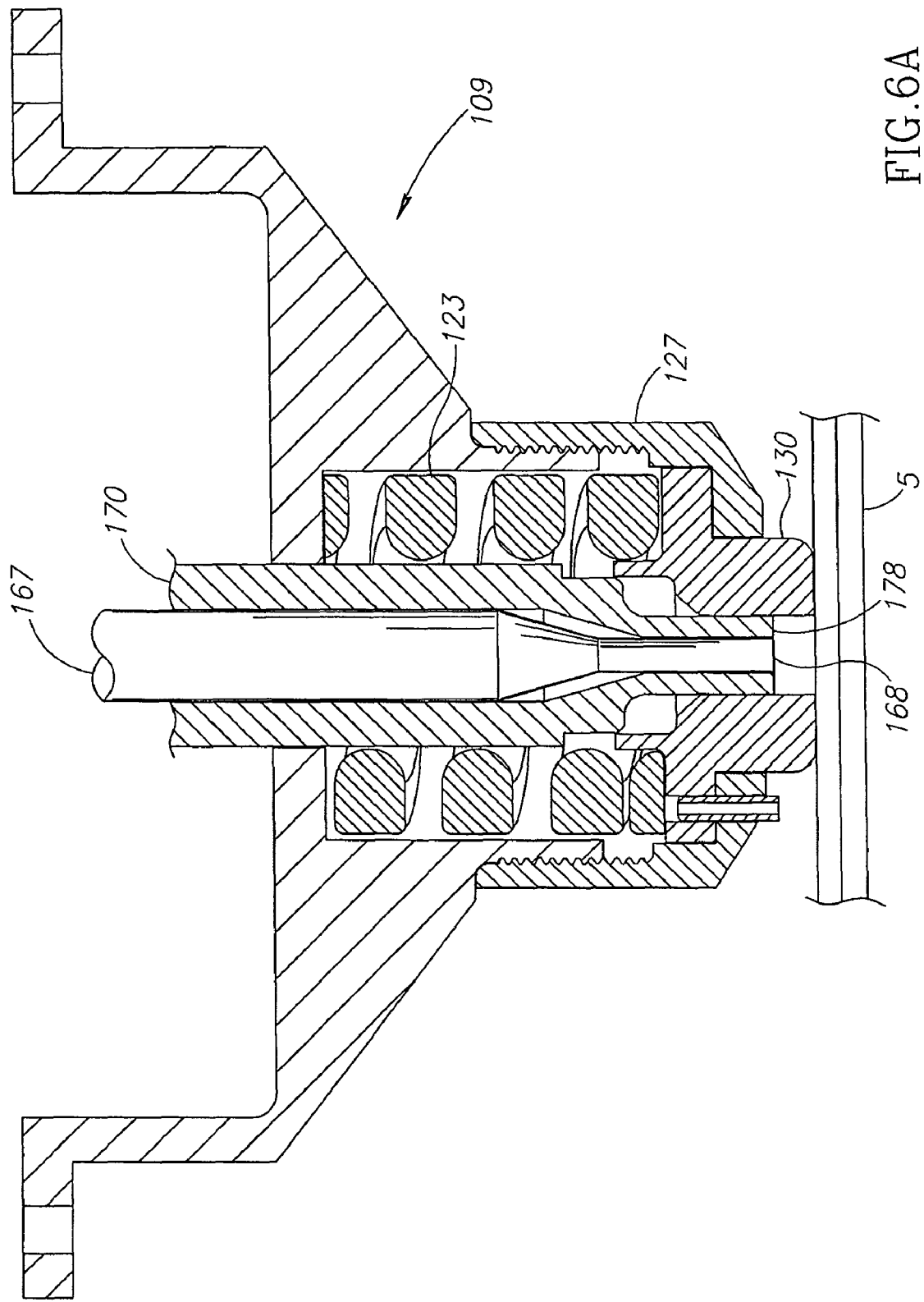
FIG. 6A is a cross-section of the pressure foot assembly of FIG. 4 commencing to engage a workpiece.
Figure 6B:
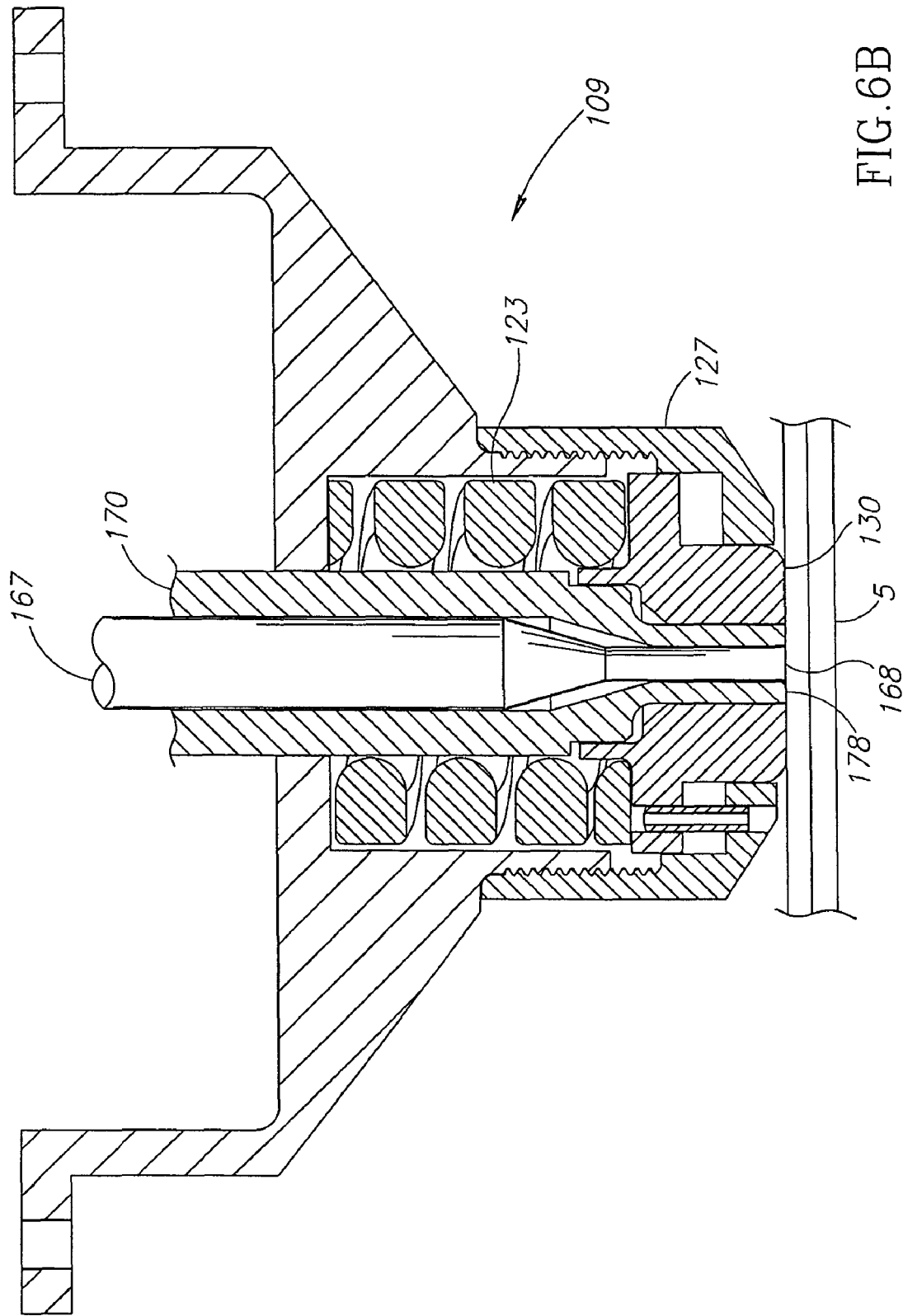
FIG. 6B is a cross-section of the pressure foot assembly of FIG. 4 engaging a workpiece.

FIGS. 6A through 6D illustrate the operation of the pressure foot assembly 109 during a friction stir spot welding manufacturing operation in accordance with an embodiment of the present invention. FIGS. 6A through 6D show the pressure foot assembly 109 through which the shoulder tool 170 (surrounding the pin tool 167) projects. In FIG. 6A, as the pressure foot assembly 109 is initially brought against a workpiece 5, the pin tip 168 of the pin tool 167 and the shoulder tip 178 of the shoulder tool 170 are initially withdrawn within the pressure foot 130. As the pressure foot 130 contacts the workpiece 5, a clamping force is applied by the die spring 123 through the pressure foot 130 against the workpiece 5. The pressure foot 130 is held laterally and positioned by the retaining cap 127. As shown in FIG. 6B, as the pressure foot assembly 109 is brought closer to the workpiece 5, the pressure foot 130 compresses upwardly within the retainer cap 127, compressing the die spring 123 and applying increasing clamping force to the workpiece 5. When a desired clamping force is applied to workpiece 5, the shoulder tip 178 and the pin tip 168 are brought into contact with the workpiece.

In operation, the shoulder tip 178 helps to retain and control flashing generated when the pin tip 168 penetrates the workpiece 5 to perform the weld. The shoulder tip 178 may also be shaped to help return material into the weld as the pin tip 168 is withdrawn at the completion of the weld. With a dual spindle drive as shown in FIG. 1, in this exemplary embodiment, the shoulder tip 178 is incorporated into a separate shoulder tool 170 which may rotate with, or may counter-rotate in opposite direction from, the pin tip 168 that penetrates the workpiece 5. With the dual spindle drive, the shoulder tool 170 may also be withdrawn away from the workpiece surface 5 when the pin tool 167 penetrates the workpiece 5, providing a recess for flashing material displaced by the pin tip 168. The tip 178 of the shoulder tool 170 can then be pressed back against the workpiece 5 as the pin tool 167 is withdrawn, forcing flashing back into the hollow which would otherwise be left by the withdrawing pin tool 167. This may advantageously leave a smoother and more uniform friction stir spot weld or conventional weld, often alleviating the necessity for later machining of the surface of weld. This process is shown in FIGS. 6C and 6D.

Figure 6C:
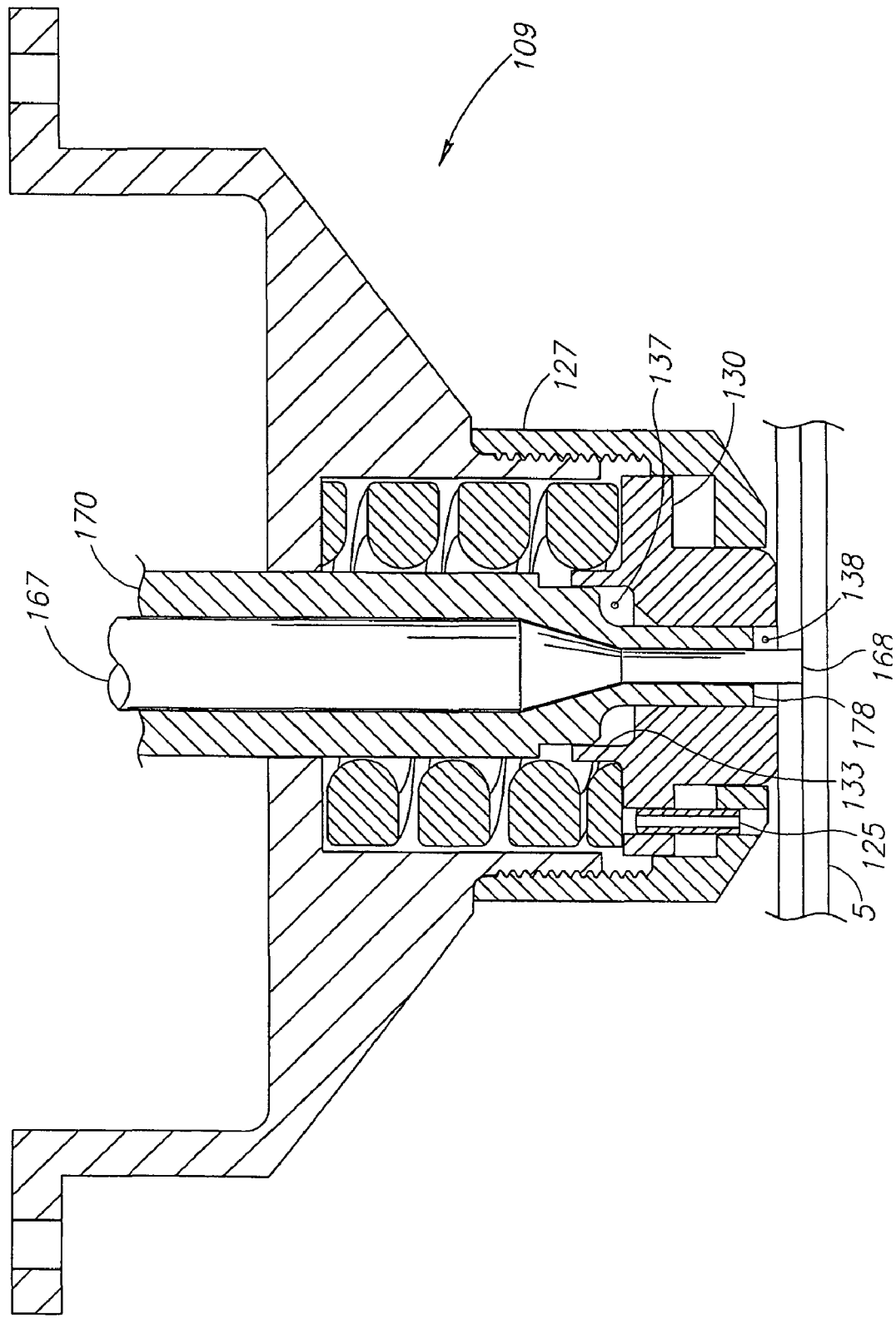
FIG. 6C is a cross-section of the pressure foot assembly of FIG. 4 with the friction stir spot welding tool penetrating the workpiece.

As shown in FIG. 6C, with the pressure foot assembly 109 engaged against the workpiece 5, the pin tip 168 (while the pin tool 167 is rotating and operating at welding speed) is penetrated into the workpiece 5. At the same time, the shoulder tip 178 is withdrawn into the pressure foot 130 leaving a recess 138 to accommodate primary flash material generated by the pin tip 168 penetrating the workpiece 5. The pressure foot 130, clamped against the workpiece without rotating and surrounding the shoulder tool 170, seals the primary flash material within the recess 138. The pin tool 167 and the shoulder tool 170 may rotate or counter-rotate during this operation. In this exemplary embodiment of the pressure foot assembly 109, as described above especially in reference to FIG. 5, withdrawal of the shoulder tool 170 away from the workpiece 5 (and thus up within the pressure foot 130) also forms a secondary cavity 137. The secondary cavity 137 suitably accommodates a portion of secondary flashing material that may work its way up between the shoulder tool 170 and the pressure foot 130. A small amount of such material can for example, migrate out of the recess 138 at the workpiece surface when the shoulder tool 170 is withdrawn from the workpiece surface to compensate for the penetration of the pin tool 167, and then pushed against the workpiece when the pin tool 167 is withdrawn to complete the weld.

Figure 6D:
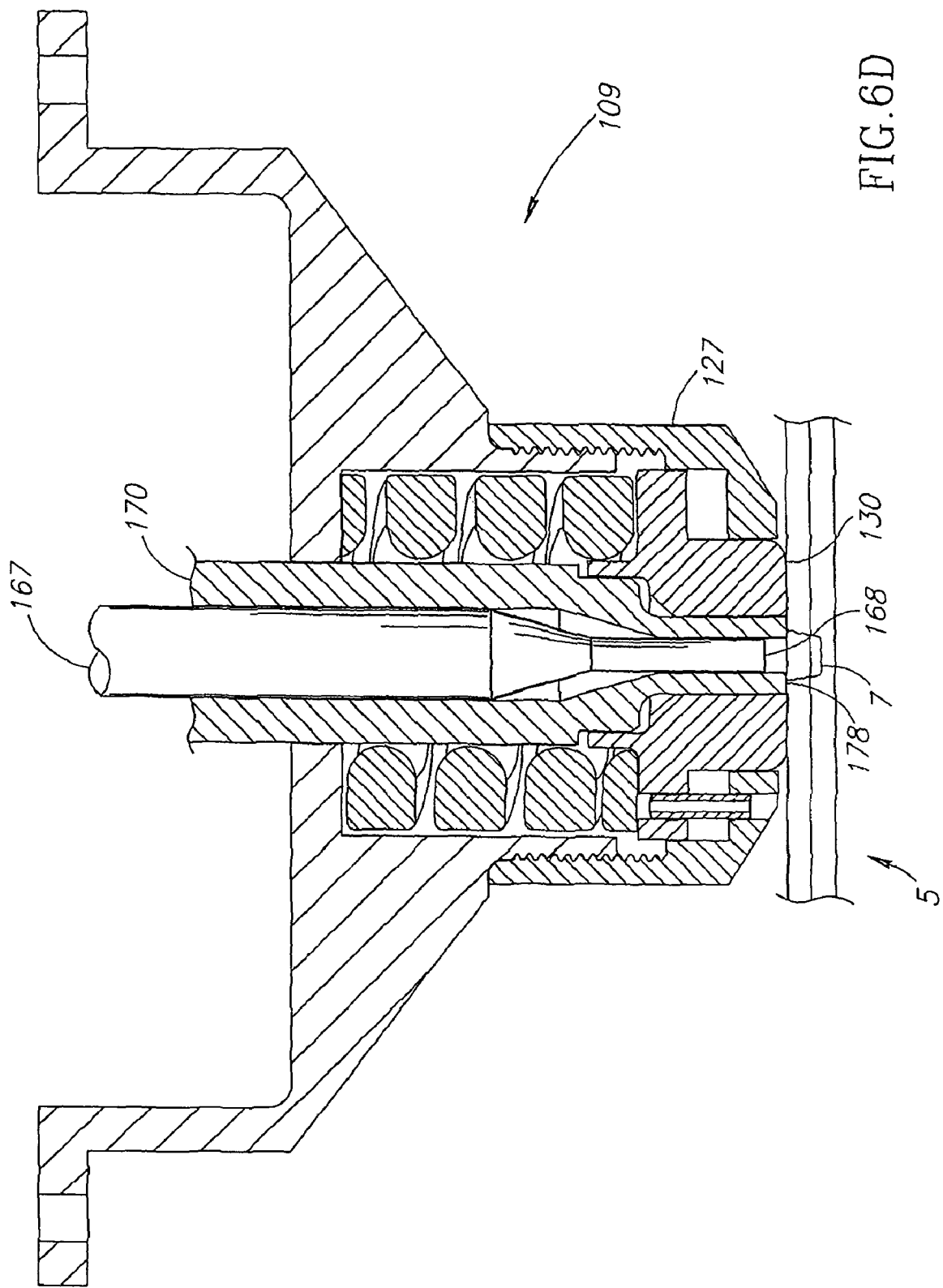
FIG. 6D is a cross-section of the pressure foot assembly of FIG. 4 with a friction stir spot welding tool withdrawn from the workpiece.

In FIG. 6D, the pressure foot assembly 109 is shown after withdrawal of the pin tip 168 of the pin tool 167 from the workpiece 5. During withdrawal of the pin tip 168 from the workpiece 5, the shoulder tip 178 of the shoulder tool 170 is contemporaneously advanced towards the surface of the workpiece 5 until the shoulder tip 178 is flush with the surface. This process forces flashing back into the weld 7. Withdrawal of the pin tip 168 from the surface of the workpiece 5 completes the weld leaving the pressure foot assembly 109 as shown in FIG. 6D with the shoulder tip 178 approximately flush against the surface of the workpiece 5, and the pin tip 168 withdrawn from the surface. During all stages, a suitable clamping force has been applied by the pressure foot 130 against the workpiece 5, holding the components of the workpiece 5 together.

While preferred and alternate embodiments of the invention have been illustrated and described, as noted above, many changes can be made without departing from the spirit and the scope of the invention. Accordingly, the scope of the invention is not limited by the disclosure of the preferred embodiment. Instead, the invention should be determined entirely by reference to the claims that follow.

What is claimed is:

1. A friction stir welding machine clamp having a spindle that rotates a shoulder tool, the nose piece defining an opening through which the spindle can pass, the clamp securing a workpiece during friction stir welding, the clamp comprising:
a clamp housing adapted to be secured to the nose piece of the friction stir spot welding machine;
a retainer cap secured to the clamp housing; and
a pressure foot at least partially in the cap and biased away from the clamp housing, the foot defining an opening through which a working portion of the shoulder tool passes, the opening allowing the shoulder tool to rotate relative to the pressure foot while the pressure foot is forced against the workpiece; wherein the pressure foot does not rotate while forced against the workpiece.

2. The clamp of claim 1, wherein the foot includes a pin to constrain the foot from rotating relative to the workpiece when the foot provides the clamping force to the workpiece.

3. The clamp of claim 1, wherein the foot surrounds the dual spindle friction stir welding tool at a contact surface of the workpiece.

4. A clamp that secures a workpiece during friction stir welding, comprising:
a clamp housing adapted to be secured to a nose piece of a dual spindle friction stir spot welding machine;
a retainer cap secured to the clamp housing; and
a foot at least partially in the cap and biased away from the housing, the foot being adapted to be engaged with and to provide a clamping force against a workpiece, the foot defining an opening through which a working portion of a dual spindle friction stir welding tool may pass to engage the workpiece
wherein the foot surrounds the dual spindle friction stir welding tool at a contact surface of the workpiece; and
wherein the foot is arranged to contain flashing material during friction stir welding by defining an aperture between the foot clamped to the workpiece and the dual spindle friction stir welding tool.

5. The clamp of claim 1, wherein the foot is biased away from the housing by a spring.

6. The clamp of claim 1, wherein the foot defines an opening through which a shoulder tool of the dual spindle friction stir welding tool may pass to engage the workpiece.

7. The clamp of claim 6, wherein the foot is arranged to contain flashing material during stir welding.

8. The clamp of claim 7, wherein the foot is arranged to contain flashing material during stir welding in a recess in contact with the surface of the workpiece.

9. The clamp of claim 1, wherein the retainer cap is removable from the housing, whereby the foot can be removed for cleaning.

10. A dual spindle friction stir welding machine clamp for securing a workpiece during friction stir welding, the machine including a welding tool and a shoulder tool, the clamp comprising:
a housing adapted to be coupled to the welding tool, the housing including:
a housing base, and
a retainer cap secured to the housing base; and
a foot linked to the housing, wherein the foot is biased away from a shoulder defined in the housing base to apply a clamping force to the workpiece and the foot is retained by the cap when the foot is discharged from the workpiece, and wherein the foot includes a retaining ring on the side opposite the workpiece, the ring and the shoulder tool defining a recess for retaining secondary flashing material displaced upward between the housing and the dual spindle friction stir welding tool.

11. The clamp of claim 10, wherein the foot is biased away from the housing by a mechanism including a spring.

12. The clamp of claim 10, wherein the foot opening provides a second recess for retaining flashing material, the second recess bounded by a tip of the shoulder tool and a surface of the workpiece.

13. The clamp of claim 10, wherein the foot includes a pin to constrain the foot from rotating relative to the workpiece when the foot applies the clamping force to the workpiece.

14. The clamp of claim 1, further comprising a pivot coupled to the housing, the pivot configured to facilitate adjustment of an engagement angle between the housing and the workpiece.

15. The clamp of claim 4, wherein the foot includes a retaining ring on the side opposite the workpiece to retain secondary flashing material displaced upward between the housing and the dual spindle friction stir welding tool.

16. The clamp of claim 10, wherein the retainer cap is threadably coupled to the housing base.

* * * * *